F. J. METZGER.
SYNTHETIC PRODUCTION OF AMMONIA.
APPLICATION FILED JUNE 12, 1918.
1,313,315.
Patented Aug. 19, 1919.
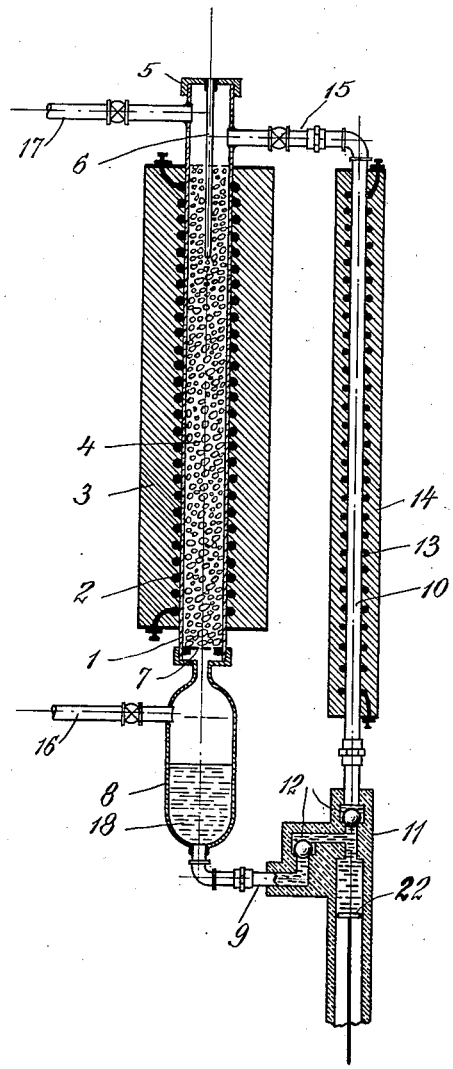
INVENTOR
Floyd J. Metzger
BY
ATTORNEYS

UNITED STATES PATENT OFFICE.

FLOYD J. METZGER, OF NEW YORK, N. Y.

SYNTHETIC PRODUCTION OF AMMONIA.

1,313,315.  Specification of Letters Patent.  Patented Aug. 19, 1919.

Application filed June 12, 1918. Serial No. 239,578.

*To all whom it may concern:*

Be it known that I, FLOYD J. METZGER, a citizen of the United States, residing at New York city, in the county of New York, State of New York, have invented certain new and useful Improvements in Synthetic Production of Ammonia; and I do hereby declare the following to be a full, clear, and exact description of the invention, such as will enable others skilled in the art to which it appertains to make and use the same.

My invention relates to improvements in the synthetic production of ammonia by the direct combination of nitrogen and hydrogen under the influence of contact substances or catalyzers.

In the synthetic production of ammonia from nitrogen and hydrogen, with the aid of a catalyzer, it is of importance that the catalyzer should be highly active and should possess a long life; and it is also of importance for the operation to be carried out at as low a temperature as possible. With the active catalyzers heretofore known, the temperature required for efficient ammonia synthesis has been high, usually around 500° C. to 750° C., and the catalytic activity, which may be satisfactory at the beginning, tends to decrease rapidly and soon reaches a point beyond which the catalyzer is of little practical value. As a result, the catalyzers require to be frequently renewed, with corresponding interruptions in the continuity of the process.

It is desirable, in the catalytic production of ammonia, to carry out the process at as high a pressure as can be maintained or as is practicable at the required temperature. The maintenance of such high pressures, however, (ranging even up to two hundred atmospheres and more) is increasingly difficult where high temperatures, such as those above referred to, are used.

The present invention relates to a process of producing ammonia which can be practiced with advantage at a relatively low temperature, and with an improved catalyzer which is active and effective at such temperature. The present invention also enables the advantages of high pressure to be retained without the disadvantages incident to the use of high temperatures.

Since the catalytic process can be carried out at a relatively low temperature, it will be evident that the mechanical difficulties involved in the construction and operation of the apparatus will be correspondingly lessened; so that very high pressures may be maintained, and the production or yield of ammonia which is promoted thereby may be correspondingly increased.

The catalyzer utilized in the process of the present invention, posseses the advantage of being highly active at temperatures as low as 200° C., or even lower, and at temperatures up to around 400° C., or up to the temperature of objectionable decomposition of the organic substances forming a part thereof, as hereinafter more fully described.

In the catalytic production of ammonia, according to processes heretofore proposed, the catalyzers employed have been particularly susceptible to impurities contained in the gases. These impurities act as "poisons", causing rapid deterioration of the catalytic material, with the result that such material soon becomes inoperative from a commercial point of view, where any appreciable amount of the poisons is contained in the reacting gases.

This is especially the case where the mixed nitrogen and hydrogen gases contain moisture or oxygen, or gases capable of forming water during the process. Any oxygen or oxygen-containing compounds present tend to react with the hydrogen under the influence of the catalyzer, with the production of water, while the oxygen similarly tends to react with the catalyzer to form an oxid. Any moisture contained in the gases or resulting from the combination of hydrogen and oxygen similarly tends to react with the catalyzer at the temperature of the reaction to form an oxid or hydroxid. The catalytic material thereby tends to become coated with a film of inactive material which gradually becomes more and more pronounced until the catalyzer ceases to function, and requires to be replaced by new catalytic material.

For the reasons pointed out, and similar reasons, the life of the usual catalyzer in the catalytic production of ammonia is comparatively short.

According to the present invention, such objections and difficulties are largely obviated. I have found that when the catalyzer material is prepared in fluent form, and when such catalyzer is employed in such a way that it can be circulated, or otherwise kept in motion during the catalytic reaction, its active life and efficiency and usefulness can be greatly increased or prolonged, and I have found, moreover, that such a catalyzer is sufficiently active at a comparatively low temperature so that the production of ammonia on a commercial scale may be greatly simplified and cheapened.

When the catalytic operation is carried out with agitation or circulation of the catalyzer within or by means of a properly constructed apparatus, the continual movement of the catalyzer mass can be made to bring about the removal by abrasion or otherwise of any film of catalyzer poison which may have formed on the surface of the particles of catalyzer, as the result of the action of the impurities contained in the gases.

By the continual removal of this film from the outer or effective surface of the catalytic material, fresh active surfaces are produced and effective contact action thereby is thus assured. As a result, the catalyzer remains active and effective for relatively long periods of time. The detached film of oxid or of other material remains suspended in the liquid medium, without, however, having any measurable ill effect on the activity of the catalyzer, or upon the catalytic reaction.

In the production of the novel fluent catalyzing composition or composite catalyzer of the present invention, I preferably make use of an organic liquid and one which has no deleterious effect on the catalyzer mass as a whole. It may be normally liquid, or it may be normally solid, or semi-solid, if it has a melting point such that it will be in suitable liquid form for circulation at the temperature of the catalytic reaction.

The boiling point of the organic substance should in general be such that it is above the predetermined maximum temperature at which the process is to be practised, at the pressure which is to be maintained in the apparatus.

The boiling point accordingly will vary and organic substances of different boiling points may be used with different forms of apparatus and with the different temperatures and pressures at which the operation is carried out. The organic liquid or liquefiable solid should be one which has no deleterious effect or action upon the primary catalyzer material.

According to the present invention, such an organic substance, liquid at the temperature at which the catalytic process is to be practised, is combined with the primary catalyzer material, to form a composite catalyzer material in which the organic liquid serves as a vehicle for the primary catalyzer material, so that the composite product as a whole is liquid or semi-liquid at the temperatures at which the process is to be practised.

It will be apparent that a large variety of liquid, semi-solid or solid organic substances may be used in the preparation of the novel catalyzers of the present invention; and all such substances which meet the requirements above referred to, I consider as within the scope of my invention.

Among the organic substances which I have employed with good results may be mentioned paraffin and other heavy fractions of petroleum products with high boiling points. When petroleum products are used, it is desirable that they should first be redistilled and that fractions should be selected for use in the preparation of the catalyzer materials which distil within a comparatively narrow temperature range.

The organic substances may be either of a saturated character, such as paraffin, or they may be unsaturated. I do not claim specifically herein the process in which catalyzers containing the unsaturated organic substances are utilized, inasmuch as such process is more particularly described and claimed in a companion application, filed of even date herewith, Serial No. 239,579, but such process in which such unsaturated organic substances are utilized, is nevertheless within the more comprehensive aspects of the present invention and is intended to be included within the more comprehensive claims appended hereto.

The general nature of the present invention will be further illustrated by the following more detailed description of certain embodiments thereof. The composite catalyzer material may, for example, be prepared as follows:

Metallic cerium or cerium alloy is treated at a suitable temperature, for example, 400° C., or less, with a mixture of hydrogen and nitrogen gases. The resulting material, after the completion of the reaction, consists essentially of a mixture of nitrid and hydrid. This material is transferred to a suitable ball or pebble mill containing paraffin or other high boiling petroleum product in a molten condition. The air in the mill is preferably displaced with nitrogen or hydrogen or other non-injurious gas; the mill is then sealed and the material ground while the temperature is maintained sufficiently high to keep the paraffin in a molten condition. When the material has been reduced to an impalpable or semi-colloidal state, it is removed from the mill and placed in any suitable container, preferably with exclusion of air therefrom, as by replacing the same with nitrogen or other inert gas.

The grinding may also be accomplished in the presence of dry kerosene oil or other suitable organic substance which is liquid at ordinary temperature. When this has been done paraffin may be added and intimately combined with the finely divided catalytic material. The kerosene or other light liquid is then removed by distillation which may be carried out at any desired temperature. As a result, the paraffin will have become intimately associated with the catalyzer material, although the grinding may have taken place at ordinary temperature in the presence of the liquid kerosene oil or other similar liquid oil. The kerosene oil, when used, is not only liquid at ordinary temperature, but is also a solvent of the paraffin, so that it dissolves the paraffin and enables its intimate distribution throughout the catalyzer, prior to the distillation of the kerosene, to take place.

The proportion of the cerium or cerium alloy catalyzer to that of the paraffin can be varied and adapted to the particular form or type of apparatus in which the catalytic operation is to be carried out. I have used with advantage amounts of nitrids and hydrids of cerium, (or of cerium alloy), in the composite catalyzer, in the proportion of one part of said nitrids and hydrids to 3 or 4 parts of paraffin and obtained good results in the catalytic production of ammonia therewith, when the catalyzer has been circulated by means of a pump during the catalytic operation.

A considerably larger proportion of the catalyzer may be used where the intermixture of the catalyzer and gases is brought about by means of mechanical stirring devices, or where the stirring and intimate intermixture is accomplished by simply forcing the gaseous mixture up through the liquid or semi-liquid catalyzer mass contained in a suitable reaction chamber.

The composite catalyzer prepared in the manner above described can be kept practically indefinitely without any material decomposition or depreciation in its catalytic activity.

In order to utilize the composite catalyzer in the catalytic production of ammonia, it is transferred from its place of storage or production to the apparatus or system in which it is to be employed. If the composite product is solid, it can be brought to a molten state and transferred as such to the catalytic apparatus.

It will be apparent that the materials forming the composite catalyzer may be made from any different constituents and in many different combinations. Thus, for example, the primary catalyzer itself may be any active ammonia catalyzer which is available for use at temperatures at which the organic substances can be utilized. So, also, the organic substances themselves, or mixtures thereof, forming the vehicle for the primary catalyzer may be of widely varying character, provided they are not prejudicial to the catalytic reaction or to the activity of the catalyzer. So, also, the composite catalyzer may be prepared in a liquid or semi-liquid form, or in a form solid at ordinary temperatures provided the composite product is liquid at the temperatures at which the reaction is to be carried out, and otherwise has properties adapting it for use in the composite catalyzer.

The organic liquid present in the composite catalyzer also serves as a protective agent as well as serving as a vehicle and imparting to the composite product the other advantages such as those above pointed out.

In the practice of the process of the present invention, for the catalytic production of ammonia, various methods of procedure may be followed and various types or systems of apparatus may be employed, for bringing about the necessary intimacy of contact between the reacting gases and the catalyzer substances. The apparatus may be adapted to contain a body of the catalyzer material heated to the proper temperature, and may be provided with means for bringing the gases into intimate contact with the fluent catalyzing composition either by bubbling the gases through the liquid or by filming or spraying or otherwise agitating the liquid and bringing it into intimate contact with the reacting gases.

It will be evident that various different types of apparatus are available for bringing about this necessary intimacy of intermixture.

The catalytic reaction of the present invention can be carried out in accordance with the method more generally described and claimed in a companion application filed by me of even date herewith No. 239,577. According to the process of said companion application, the temperature at which the catalytic operation is carried out is caused to "oscillate" or to fall and rise periodically, during the catalytic operation, so that increased efficiency and prolonged life of the catalyzer are thereby secured.

The process of the present invention, however, may be practised without such "oscillation", or fall and rise of the temperature during the progress of the operation; and the advantages incident to the practice of the invention will nevertheless be secured to a greater or less degree. When, in addition, the process is carried out with such oscillation of the temperature, added advantage will, in most cases, nevertheless be obtained; and I consider the process of the present invention as of particular value when practised with such added oscillation, or rise and fall of the temperature during its progress.

The invention will be further described and illustrated by the following more detailed description taken in combination with the accompanying drawing illustrative of a type or system of apparatus adapted to the practice of the present invention, and adapted to the practice of this invention with the added advantages incident to the oscillation, or fall and rise of the temperature during the progress of the catalytic reaction.

In the accompanying drawing, the catalytic chamber is indicated at 1, and is surrounded by an electric heating coil 2 and an outer insulating covering 3. The chamber is filled with a large number of small ball-like particles 4, which may, for instance, consist of small beads of glass, which serve to break up ascending gaseous currents and descending liquid currents and to bring the gases and the catalyzer into still more intimate intermixture and contact with each other. The chamber 1 is provided with a cover 5 by means of which the fluent catalyzing composition may be introduced, and this cover is provided with a well 6 into which a thermometer may be introduced to ascertain the temperature of the interior of the apparatus.

At the lower end of the chamber 1 is a perforated plate or wire screen 7 by which the particles 4 are supported, and through which the entering gases may pass upwardly and the catalyzer material downwardly. At the lower end of the chamber 1 is also secured a chamber 8, the lower end of which is connected through a passageway 9 with an upright conduit 10. In the connection between the passageway 9 and conduit 10 is a pump 11 having check valves 12 therein which serve to prevent back flow from the conduit 10 to the passageway 9. The piston of this pump is indicated at 22.

The conduit 10 is also surrounded with a heating coil 13 and insulation 14, and is connected at its upper end by means of a passageway 15 with the upper end of the chamber 1.

An inlet pipe 16 is provided for the introduction of the mixture of nitrogen and hydrogen, and an outlet pipe 17 is provided at the top of the apparatus for the escape of the ammonia and unchanged gases.

In the operation of the apparatus, and the practice of the process of the present invention therein, the composite catalyzer, in liquid form, may be introduced by removing the cover 5. This catalyzing composition will pass down through the chamber 1 and collect in the chamber 8 as indicated at 18. When a sufficient amount of the catalyzer has been introduced, the cover 5 is secured in place so that the apparatus as a whole is closed and capable of withstanding the necessary pressure at which the process is to be practised. The chamber 1 is then heated to the temperature required for the catalytic process, and a mixture of nitrogen and hydrogen is passed in through the pipe 16 and caused to pass upwardly through the chamber 1. At the same time, the catalyzing composition is circulated by means of the pump 11 from the chamber 8 through the conduit 10 to the top of the chamber 1, and caused to spread out and pass downwardly over the particles 4 contained in the chamber.

The catalyzer and gases will thus be brought into most intimate contact during the upward passage of the gases and the downward flow of the composite catalyzer and the catalytic reaction will be thereby brought about. The ammonia formed, together with unconverted nitrogen and hydrogen, will escape through the pipe 17, and may be conveyed to any suitable place of absorption or use. Any unchanged nitrogen and hydrogen may be recovered and returned to the apparatus in the further carrying out of the process.

The electric heating coil surrounding the conduit 10 enables the liquid catalyzer to be heated where desired, before its introduction into the chamber 1. This preheating may be sufficient only to prevent the catalyzer from solidifying, in case the organic liquid employed is one which is solid at normal temperatures. The preheating may be to a higher temperature than that prevailing in the chamber 1, so that the catalyzer will be cooled somewhat while passing through said chamber. However, as hereinafter set forth, it is preferable to maintain the temperature in the conduit 10 considerably lower than that in the chamber 1, so that the liquid catalyzer will gradually rise in temperature during its flow through chamber 1. Accordingly, the circulation of the catalyzer can be so effected that its temperature will be caused to oscillate periodically during the operation of the process in either of the ways described. To this end the heating coil 2 may be so regulated as to increase and decrease the temperature periodically, or the apparatus may be otherwise regulated so that local temperature variations will take place without interruption of the continuous operation of the process.

Instead of causing the nitrogen and hydrogen gases to ascend through the apparatus, in counter-current to the down-flowing composite catalyzer, the gaseous mixture may be introduced at the top of the apparatus and caused to flow downwardly with the catalyzer, thereby promoting the downward flow of the catalyzer as well as coming into intimate contact therewith.

The oscillations, or fall and rise, periodically, of the temperature during the progress of the reaction, will result in a further prolongation of the life of the catalyzer, and a corresponding increase in the efficiency thereof and in the amount of ammonia produced, especially with catalyzers which are commonly considered the most active catalyzers but which, because of their sensitiveness to catalyzer poisons, have a comparatively short life, and depreciate rapidly when they are utilized at a fixed temperature. As more fully pointed out in my companion application (Case A) this quick depreciation of the active and sensitive catalyzers, when such catalyzers are utilized, can be largely overcome, the catalytic efficiency very materially increased, and the life of the catalyzer prolonged, by causing such oscillations during the progress of the catalytic operation. By means of such oscillations, a catalyzer which has become inactive at a fixed temperature, may be restored to activity periodically when its activity has become reduced.

In the apparatus illustrated in the accompanying drawing, if the temperature in the conduit 10 is maintained considerably lower than that in the chamber 1, this oscillation in temperature will be brought about since the liquid catalyzer will be cooled during its flow from the bottom of the chamber 1 back to the top thereof through the conduit 10; while this cooled composite catalyzer will be reheated in the chamber 1 and during its downward passage therethrough.

It will be apparent, therefore, that the oscillation, or fall and rise, periodically, of the temperature can be readily brought about without interfering with the continuous operation of the apparatus.

I do not claim herein, broadly, the catalytic process of producing ammonia in which the temperature is caused to oscillate in the manner above described, since such process is claimed in its more general aspects in said companion application Serial No. 239,579; but the claims of the present application, so far as they relate to the process in which the temperature is caused to oscillate, relate more particularly to a process in which a fluent composite catalyzer is employed and in which the reaction is brought about between the fluent catalyzer and the reacting gases.

The organic liquid employed in the process of the present invention may, with advantage, be an unsaturated organic liquid such as cottonseed oil, which will have a further action in promoting the catalytic reaction; but I do not claim specifically herein a process in which such unsaturated organic liquids are employed as promoters inasmuch as this specific aspect of the present invention is specifically claimed in my companion application Serial No. 239,579.

It will be understood that the mixture of nitrogen and hydrogen gases to be converted into ammonia according to the present invention may be introduced at any desired pressure appropriate to the required yield and may range from atmospheric pressure up to say two hundred atmospheres according to the facilities at the disposal of the operator and the desired output. Relatively high pressures will, in most cases, be desirable,—the preferred range being from as high as fifty atmospheres up to two hundred atmospheres. In fact, even higher temperatures may be employed, but usually without compensating benefit.

What I claim is:

1. The method of producing ammonia synthetically, which comprises bringing a mixture of hydrogen and nitrogen gases into intimate contact with a fluent catalyzing composition at a temperature appropriate to the catalytic production of ammonia therewith.

2. The method of producing ammonia synthetically, which comprises bringing a mixture of hydrogen and nitrogen gases into intimate contact with a fluent catalyzing composition at a temperature appropriate to the catalytic production of ammonia therewith, and keeping the catalyzer in motion during the operation.

3. The method of producing ammonia synthetically, which comprises bringing a mixture of hydrogen and nitrogen gases into intimate contact with a liquid catalyzing composition, made up of finely divided catalytic material in an organic liquid vehicle, at a temperature appropriate to the catalytic production of ammonia therewith.

4. The method of producing ammonia synthetically, which comprises circulating a mixture of hydrogen and nitrogen gases into contact with a catalyzing composition, made up of finely divided catalytic material in a liquid vehicle, at a temperature appropriate to the catalytic production of ammonia therewith, and effecting intimate intermixture of the catalyzing composition and of the gases in order to promote the catalytic reaction.

5. The method of producing ammonia synthetically, which comprises bringing a mixture of hydrogen and nitrogen gases into contact with a catalyzing composition, made up of finely divided catalytic material in a liquid vehicle at a temperature appropriate to the catalytic production of ammonia, and agitating the catalyzing composition by causing the catalyzer and the reacting gases to flow simultaneously through the zone of reaction.

6. The method of producing ammonia synthetically, which comprises bringing a mixture of hydrogen and nitrogen gases into contact with a fluid catalyzing composition, made up of finely-divided catalytic material in a liquid vehicle, at a temperature appropriate to the catalytic production of ammonia, and agitating the liquid catalyzing composition by causing the catalyzing composition and the reaction gases to flow simultaneously through the zone of reaction in counter-current direction.

7. The method of producing ammonia synthetically, which comprises circulating a catalyzing composition, made up of finely divided catalytic material carried by a liquid vehicle, through a suitable reaction chamber, circulating a mixture of nitrogen and hydrogen gases through said reaction chamber and effecting an intimate intermixture of the catalyzing composition and of the gaseous mixture in said reaction chamber, at a temperature appropriate to the catalytic production of ammonia.

8. The method of producing ammonia synthetically, which comprises circulating a catalyzing composition, made up of finely divided catalytic material carried by a liquid vehicle, through a suitable reaction chamber, circulating a mixture of nitrogen and hydrogen gases through said reaction chamber and effecting an intimate intermixture of the catalyzing composition and of the gaseous mixture in said reaction chamber, by causing the catalyzing composition and the gases to flow over spreading surfaces at a temperature appropriate to the catalytic production of ammonia.

9. The method of producing ammonia synthetically, which comprises bringing a mixture of hydrogen and nitrogen gases into contact with a catalyzing composition under high pressure and at a temperature below 400° C. and effecting intimate intermixture of the catalyzing composition with the gaseous mixture, the catalyzing composition being made up of finely divided catalytic material and of an organic substance liquid at the temperature of the catalytic reaction and having a boiling point above the temperature of the reaction at the pressure at which the reaction is carried out.

10. The method of producing ammonia synthetically, which comprises bringing a mixture of hydrogen and nitrogen gases into intimate contact with a catalyzing composition made up of finely divided catalytic material carried by an organic vehicle, and agitating the catalyzing composition during the catalytic reaction to avoid the filming of inactive material upon the surface of the catalytic material, and thereby prolonging the activity of the catalyzer and the catalytic reaction.

11. The method of producing ammonia synthetically, which comprises bringing a mixture of hydrogen and nitrogen gases into contact with a fluent catalyzing composition at a temperature appropriate to the catalytic production of ammonia, and periodically causing the temperature of the catalyzer to oscillate.

12. The method of producing ammonia synthetically, which comprises bringing a mixture of hydrogen and nitrogen gases into contact with a catalyzing composition at a temperature appropriate to the catalytic production of ammonia, and periodically causing the temperature of the catalyzer to oscillate, said catalyzing composition being made up of finely divided catalytic material and of an organic vehicle therefor, liquid at the temperature of the catalytic reaction.

13. The method of producing ammonia synthetically, which comprises circulating a mixture of hydrogen and nitrogen gases into contact with a catalyzing composition at a temperature appropriate to the catalytic production of ammonia, causing the catalyzing composition and gaseous mixture to be intimately intermingled during the process, and periodically causing the temperature of the catalyzing composition to oscillate, said catalyzing composition being made up of finely divided catalytic material in an organic vehicle liquid at the temperature of the catalytic reaction.

14. The method of producing ammonia synthetically, which comprises bringing a mixture of hydrogen and nitrogen gases into contact with a fluid catalyzing composition, made up of finely divided catalytic material in an organic vehicle, active at a temperature of around 200° C. and causing the temperature of such catalyzer to oscillate periodically from said temperature.

15. The method of producing ammonia synthetically, which comprises bringing a mixture of hydrogen and nitrogen gases into intimate contact with a catalyzing composition, made up of finely divided catalytic material in an organic vehicle, at a temperature appropriate to the catalytic production of ammonia, agitating the said catalyzing composition to bring about intimate intermixture of the catalyzing composition and gaseous mixture, and causing the temperature of the catalyzing composition to rise and fall periodically over a comparatively wide range during the progress of the catalytic reaction.

16. The method of producing ammonia synthetically, which comprises circulating a catalyzing composition, made up of a finely divided catalyzer material in an organic vehicle through a reaction chamber, circulating a mixture of hydrogen and nitrogen gases through said chamber, causing the catalyzing composition and the gaseous mixture to be spread out and brought into intimate contact in said chamber, and withdrawing therefrom the ammonia produced.

17. The method of producing ammonia synthetically, which comprises passing a catalyzing composition, made up of finely divided catalytic material in an organic vehicle, through a reaction chamber, bringing the mixture of hydrogen and nitrogen gases into intimate contact with the catalyzing composition in said chamber, at a temperature appropriate to the catalytic production of ammonia, re-passing the catalyzing composition through said chamber, and causing the temperature of the catalyzing composition to oscillate during its circulation.

18. The method of producing ammonia synthetically, which comprises passing a fluent catalyzing composition through a reaction chamber, bringing a mixture of hydrogen and nitrogen gases into intimate contact therewith at a temperature appropriate to the catalytic production of ammonia, withdrawing the catalyzing composition and re-passing the same through the reaction chamber, and raising or lowering the temperature of the catalyzing composition while it is being circulated, whereby the temperature of the catalyzing composition is caused to oscillate, and a substantially constant temperature is maintained in the reaction chamber.

19. The method of producing ammonia synthetically, which comprises bringing a mixture of hydrogen and nitrogen gases into intimate contact with a catalyzing composition at a temperature appropriate to the catalytic production of ammonia therewith, said catalyzing composition being made up of finely divided catalytic material in a saturated organic vehicle.

20. The method of producing ammonia synthetically, which comprises bringing a mixture of hydrogen and nitrogen gases into intimate contact with a catalyzing composition, at a temperature appropriate to the catalytic production of ammonia therewith, said catalyzing composition being made up of finely divided catalytic material in a high-boiling saturated hydrocarbon vehicle.

21. The method of producing ammonia synthetically, which comprises bringing a mixture of hydrogen and nitrogen gases into intimate contact with a cerium catalyzer, admixed with an organic liquid, at a temperature appropriate to the catalytic production of ammonia.

22. The method of producing ammonia synthetically, which comprises bringing a mixture of hydrogen and nitrogen gases into intimate contact with a cerium catalyzer, admixed with an organic liquid, at a temperature appropriate to the catalytic production of ammonia, and causing the temperature of the catalyzer to rise and fall periodically during the progress of the catalytic reaction.

23. In the production of ammonia synthetically, according to the procedure as defined in claim 1, the carrying on of said procedure at superatmospheric pressure.

24. In the production of ammonia synthetically, according to the procedure as defined in claim 3, the carrying on of said procedure at super-atmospheric pressure.

25. In the production of ammonia synthetically, according to the procedure as defined in claim 5, the carrying on of said procedure at super-atmospheric pressure.

26. In the production of ammonia synthetically according to the procedure as defined in claim 11, the carrying on of said procedure at super-atmospheric pressure.

27. In the production of ammonia synthetically, according to the procedure as defined in claim 19, the carrying on of said procedure at super-atmospheric pressure.

28. In the production of ammonia synthetically, according to the procedure as defined in claim 21, the carrying on of said procedure at super-atmospheric pressure.

29. In the production of ammonia synthetically, according to the procedure as defined in claim 22, the carrying on of said procedure at super-atmospheric pressure.

In testimony whereof I affix my signature.

FLOYD J. METZGER.